No. 677,206. Patented June 25, 1901.
H. S. HALE.
MOLDING FOR CAR SEATS.
(Application filed Apr. 29, 1901.)
(No Model.)
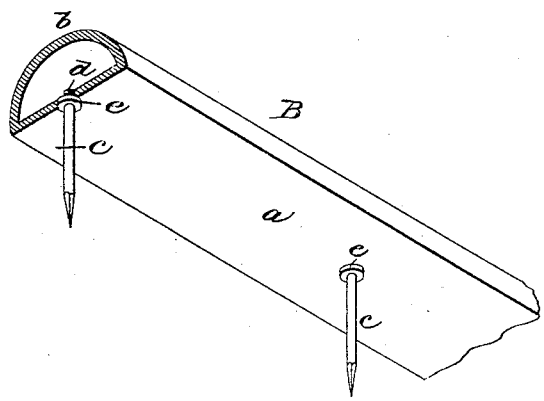
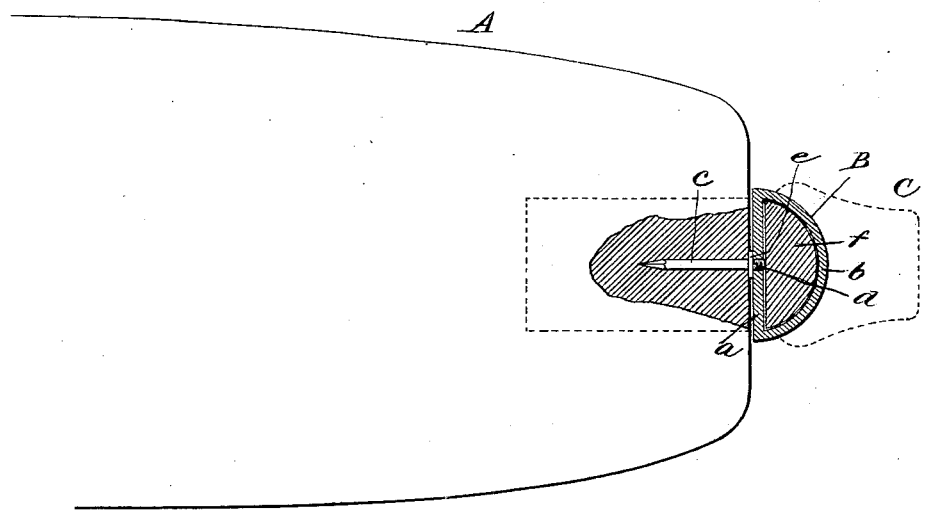
Witnesses:
Inventor
Henry S. Hale
By Dyer, Edmonds & Dyer
Att'ys.

UNITED STATES PATENT OFFICE.

HENRY S. HALE, OF PHILADELPHIA, PENNSYLVANIA.

MOLDING FOR CAR-SEATS.

SPECIFICATION forming part of Letters Patent No. 677,206, dated June 25, 1901.

Application filed April 29, 1901. Serial No. 57,876. (No model.)

*To all whom it may concern:*

Be it known that I, HENRY S. HALE, a citizen of the United States, residing at Philadelphia, in the county of Philadelphia and State of Pennsylvania, have invented a certain new and useful Improvement in Moldings for Car-Seats, of which the following is a specification.

My invention relates to improvements in moldings for car-seats; and my object is to provide an improved molding for this purpose which can be readily and securely applied in place and which shall be highly ornamental in appearance.

In order that the invention may be better understood, attention is directed to the accompanying drawings, in which—

Figure 1 is a perspective view of a portion of the molding, showing one manner of applying the retaining-nails in place; and Fig. 2 a cross-sectional view through the same, showing the molding applied in position to the back of a car-seat.

In both of the above views corresponding parts are represented by the same letters of reference.

A represents any usual and ordinary car-seat back, to the edges of which the molding B is applied. This molding is formed with a flat inner side $a$ and a rounded outer surface $b$. It may be conveniently made of continuous tubing passed through die-rolls to draw it to the proper shape. The surface $b$ may be plated, chased, or otherwise ornamented. The molding is secured in place to the seat-back by nails $c$, which are driven into the woodwork thereof and which are secured in place in the molding in any suitable way—as, for instance, by threads $d$. If desired, each nail may be formed with a flange $e$, bearing against the inner surface $a$ of the molding.

In applying the molding in place a tool C, having a curved under surface corresponding to the curve of the surface $b$, is applied to the molding, and by means of a hammer the nails will be forced into the woodwork, thus preventing any possibility of disfiguring or otherwise injuring the ornamental surface of the molding. If desired, the molding may be provided interiorly with a lining $f$, made preferably of ratan, so that when the molding is bent around corners it will not collapse or buckle, or, if desired, the lining $f$ may be applied to only such portions of the molding as are coincident with such corners.

Having now described my invention, what I claim as new, and desire to secure by Letters Patent, is as follows:

1. As a new article of manufacture, a car-seat molding comprising a hollow tube and attaching-nails connected to said tube.

2. As a new article of manufacture, a car-seat molding comprising a hollow tube having a flat inner surface and attaching-nails secured to said tube and projecting from said flat surface.

3. As a new article of manufacture, a car-seat molding comprising a hollow tube having a flat under surface, and attaching-nails screwed into the tube and projecting from said flat surface.

4. As a new article of manufacture, a car-seat molding comprising a hollow tube having a flat under surface, and attaching-nails screwed into the tube and projecting from said flat surface, each nail having a flange or shoulder which abuts against the flat surface of the tube.

5. As a new article of manufacture, a car-seat molding comprising a hollow tube, attaching-nails connected to said tube, and a lining within said tube.

6. As a new article of manufacture, a car-seat molding comprising a hollow tube having a flat inner surface, attaching-nails secured to said tube and projecting from said flat surface, and a lining within said tube.

7. As a new article of manufacture, a car-seat molding comprising a hollow tube having a flat inner surface, attaching-nails secured to said tube and projecting from said flat surface, and a ratan lining within said tube.

This specification signed and witnessed this 25th day of April, 1901.

HENRY S. HALE.

Witnesses:
 GEO. H. RAPSON,
 H. C. SEELY.